(12) United States Patent
Lo

(10) Patent No.: US 6,776,460 B1
(45) Date of Patent: Aug. 17, 2004

(54) COMBINATION OF SPOKES AND RIMS FOR BICYCLES

(76) Inventor: Chun-Hsun Lo, No. 125, Lane 802, Fonglun Village, Bitou Township, Changhua County (TW)

( * ) Notice: Subject to any disclaimer, the term of this patent is extended or adjusted under 35 U.S.C. 154(b) by 0 days.

(21) Appl. No.: 10/642,340

(22) Filed: Aug. 15, 2003

(51) Int. Cl.$^7$ ................................................. B60B 1/14
(52) U.S. Cl. ...................... 301/58; 301/95.104; 301/104
(58) Field of Search .............................. 301/55, 58, 73, 301/79, 95.104, 95.106, 104

(56) References Cited

U.S. PATENT DOCUMENTS

| | | | | |
|---|---|---|---|---|
| 309,566 A | * | 2/1884 | Schad et al. ................... | 301/58 |
| 456,218 A | * | 7/1891 | Goodrich ...................... | 301/55 |
| 780,615 A | * | 1/1905 | Newton ........................ | 301/58 |

* cited by examiner

Primary Examiner—Russell D. Stormer
(74) Attorney, Agent, or Firm—Alan D. Kamrath; Nikolai & Mersereau, P.A.

(57) ABSTRACT

A bicycle rim includes a plurality of elongate slots each of which is composed of a first diameter portion and a second diameter portion which is smaller than the first diameter portion. A tube having threaded outer periphery is inserted in each elongate slot and a core piece is inserted through a passage in the tube. The tube has a flange engaged with an inside of the rim and a cover member covering each elongate slot has a threaded hole for being threadedly connected to the threaded outer periphery of the tube. A protrusion extends from a side of the cover member so as to be engaged with the first diameter portion while the tube is shifted to the second diameter portion. A spoke is inserted in the core piece and threadedly connected to a threaded inner periphery of the core piece.

3 Claims, 6 Drawing Sheets

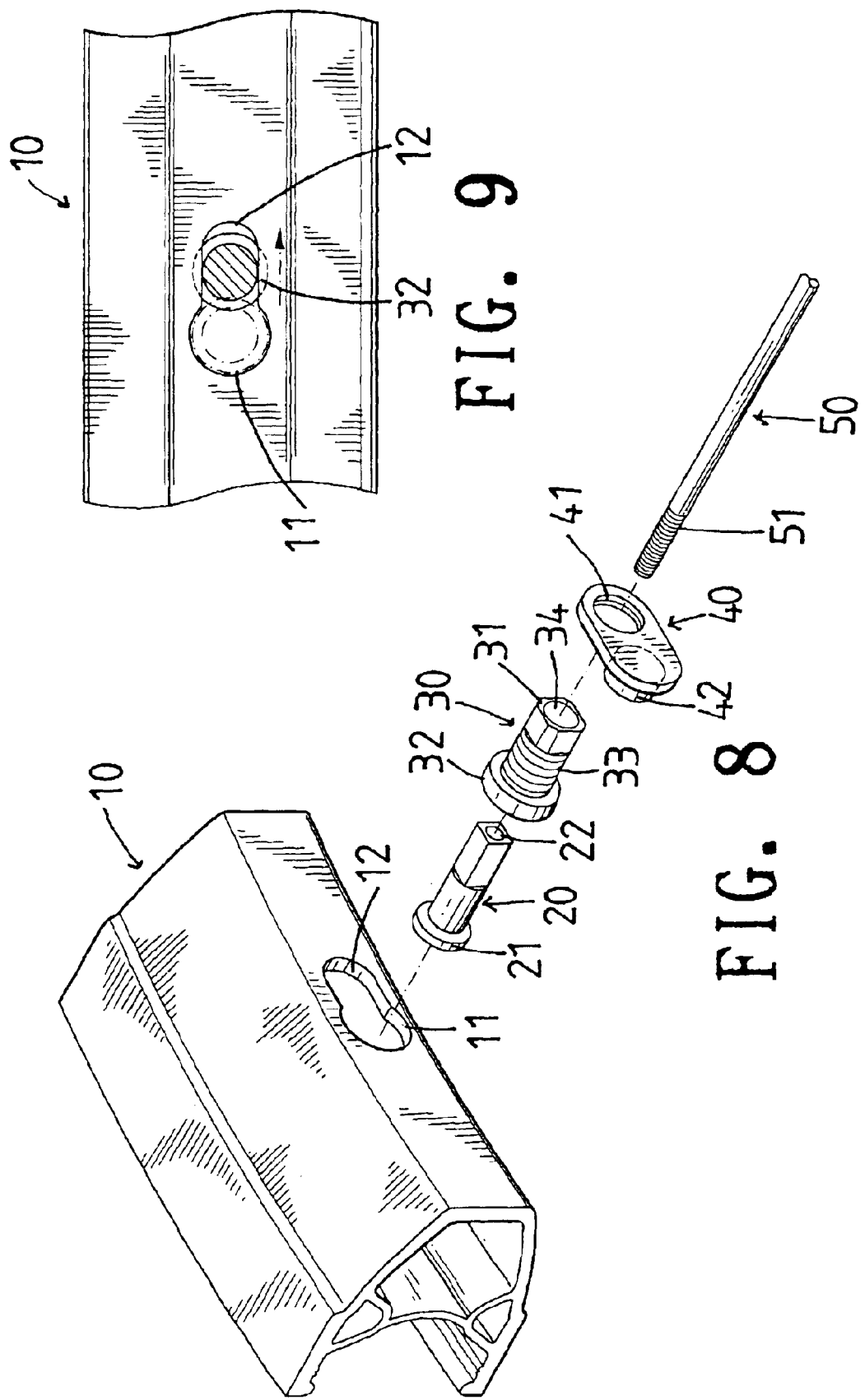

COMBINATION OF SPOKES AND RIMS FOR BICYCLES

FIELD OF THE INVENTION

The present invention relates to a bicycle rim having a plurality of elongate slots for being connected with spokes. The spokes are easily installed to or disengaged from the rim.

BACKGROUND OF THE INVENTION

A conventional connection between bicycle rim and spokes is shown in FIG. 1 and generally includes a plurality of holes 101 defined through the rim 100 for being connected with spokes 102 which has one end extends through the hole 101 and is fixed by a nut 103 at the inside of the rim 100. This combination requires an I-shaped rubber seal (not shown) to seal the hole 101 if a tubeless tire is used. Nevertheless, it takes a lot of time to install the rubber seal into the hole and the seal tends to be deformed or damaged after being used for a period of time.

FIGS. 2 to 4 show another embodiment of the conventional way for the connection of the rim 100' and spokes 102', wherein each hole 101' in the rim 100 is inserted with a metal tube 104 through which the spoke 102' extends. One end of the metal tube 104 includes a plurality of longitudinal slits 105 and the spoke 102' includes an enlarged head 1021. A nut 106 is threadedly mounted to the spoke 102' and may pull the enlarged head 1021 to expand the end of the metal tube 104 by the slits 105 as shown in FIG. 3. However, a tool is required to pull the spoke 102 out from the metal tube 104 when the spokes 102' are to be replaced with new ones. The metal tubes 104 are then be damaged and have to be replaced with the spokes 102'. This increase the maintenance cost.

FIG. 5–7 show yet another embodiment of the conventional way for the connection of the rim 100" and spokes 102", wherein the spoke 102": rotatably extends through a tube 107 having threaded outer periphery. A rectangular flange 108 is connected to an end of the tube 107 and located at the inside of the time 100" and a nut 109 is threadedly mounted to the threaded outer periphery of the tube 107 so that the tube 107 is securely engaged with the hole in the rim 100". It is noticed that the flange 108 contacts the inside of the rim 100" at only two lines instead of surface, so that the flange 108 tends to be deformed and affects the tension of the spokes 10".

The present invention intends to provide a combination between spokes and rim, and the holes in the rim are well sealed and the spokes are conveniently installed.

SUMMARY OF THE INVENTION

In accordance with one aspect of the present invention, there is provided a bicycle rim having a plurality of elongate slots and each elongate slots is composed of a first diameter portion and a second diameter portion which is smaller than the first diameter portion. A tube having a threaded outer periphery has a flange on a first end thereof and a passage is defined longitudinally through the tube. The tube is inserted in each of the elongate slots and the flange is engaged with an inside of the rim. A core piece is inserted through the passage of the tube and has an enlarged head at a first end of the core piece. The enlarged head is engaged with the first end of the tube and a threaded inner periphery is defined in the core piece so that an end of a spoke is inserted in the core piece and threadedly engaged with the threaded inner periphery in the core piece. A cover member has a threaded hole defined therethrough which is threadedly connected to the threaded outer periphery of the tube. A protrusion extends from a side of the cover member and is engaged with the first diameter portion of each elongate slot. The cover member is connected to an outside of the rim and covers up each elongate slot.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 8 is an exploded view to show the combination of the spokes and the rim of the present invention;

FIG. 9 shows the tube is shifted from the first diameter portion to the second diameter portion of the elongate slot in the rim of the present invention;

DETAILED DESCRIPTION OF THE PREFERRED EMBODIMENT

Figure 10:
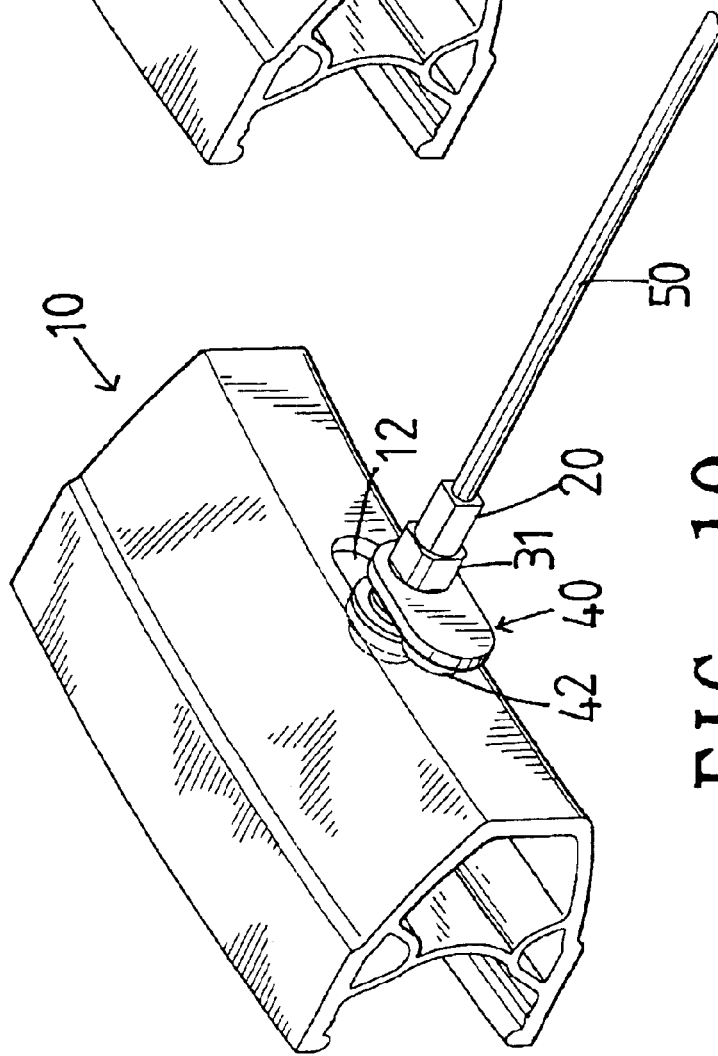
FIG. 10 shows that the cover member is not yet shifted to cover the elongate slot.

Referring to FIGS. 8 and 10, the rim 10 of the present invention comprises a plurality of elongate slots and each elongate slot is composed of a first diameter portion 11 and a second diameter portion 12 which is smaller than the first diameter portion 11.

A tube 30 has a flange 32 on a first end thereof and a passage 34 is defined longitudinally through the tube 30. The tube 30 is inserted in each of the elongate slots and the flange 32 is engaged with an inside of the rim 10 along the periphery of the elongate slot. The tube 30 has a threaded outer periphery 33 and a polygonal outer periphery 31 on a second end of the tube 30.

Figure 12:
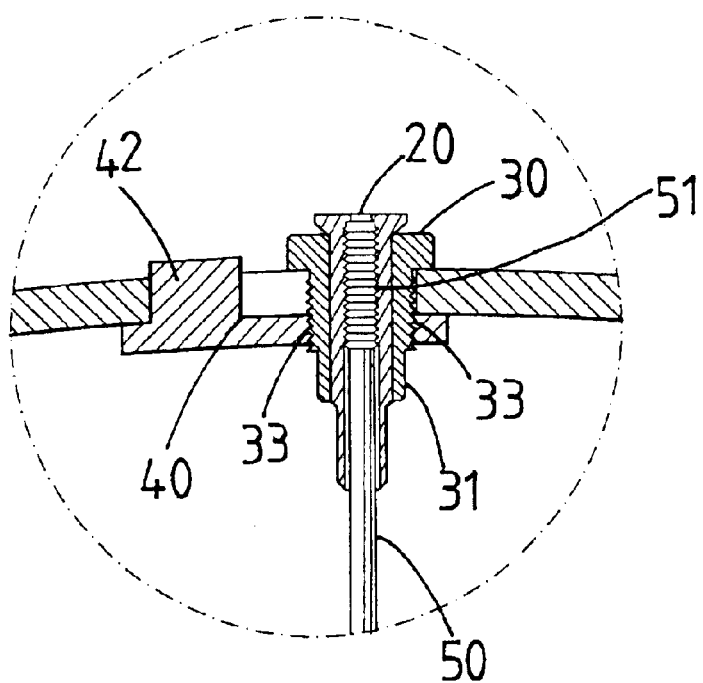
FIG. 12 is a cross sectional view which shows the tube and the cover member are engaged with the elongate slot in the rim.

A core piece 20 is inserted through the passage 34 of the tube 30 and has an enlarged head 21 at a first end of the core piece 20. The enlarged head 21 is engaged with the first end of the tube 30 as shown in FIG. 12, and a threaded inner periphery is defined in the core piece 20. A spoke 50 has a threaded end 51 which is inserted in the core piece 20 from a second end of the core piece 20 and threadedly engaged with the threaded inner periphery in the core piece 20.

Figure 1:
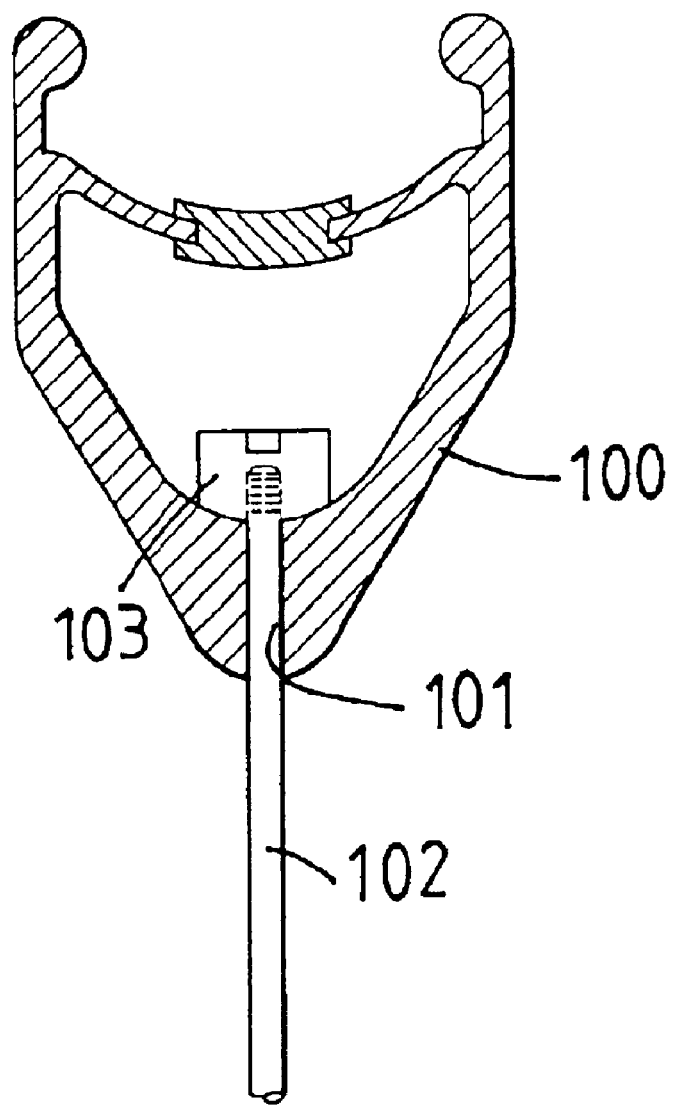
FIG. 1 is a cross sectional view of a first embodiment of conventional combination of bicycle rim and spokes.
Figure 2:
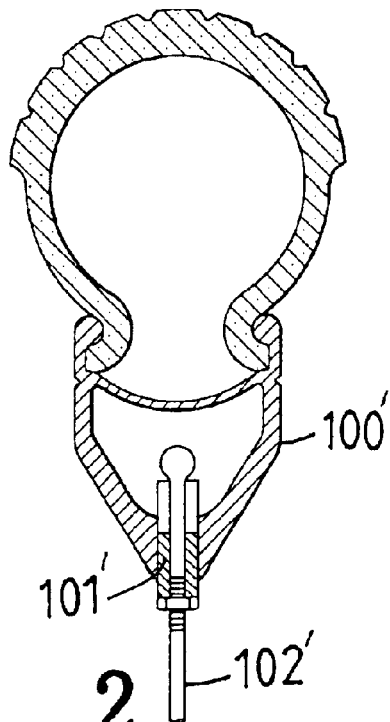
FIG. 2 is a cross sectional view of a second embodiment of conventional combination of bicycle rim and spokes.
Figure 4:
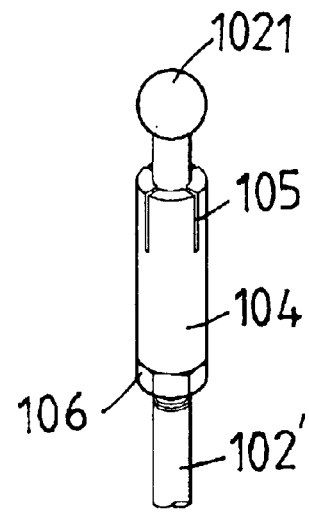
FIG. 4 is a perspective view to show the metal tube and spoke of the second embodiment of the conventional combination of bicycle rim and spokes.
Figure 3:
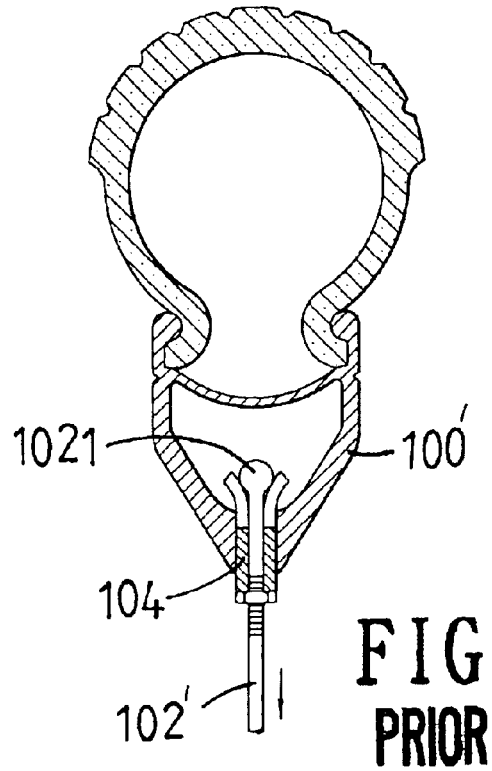
FIG. 3 shows a cross sectional view of the second embodiment of conventional combination of bicycle rim and spokes, wherein the enlarged head of the spoke is pulled to expand the metal tube.
Figure 5:
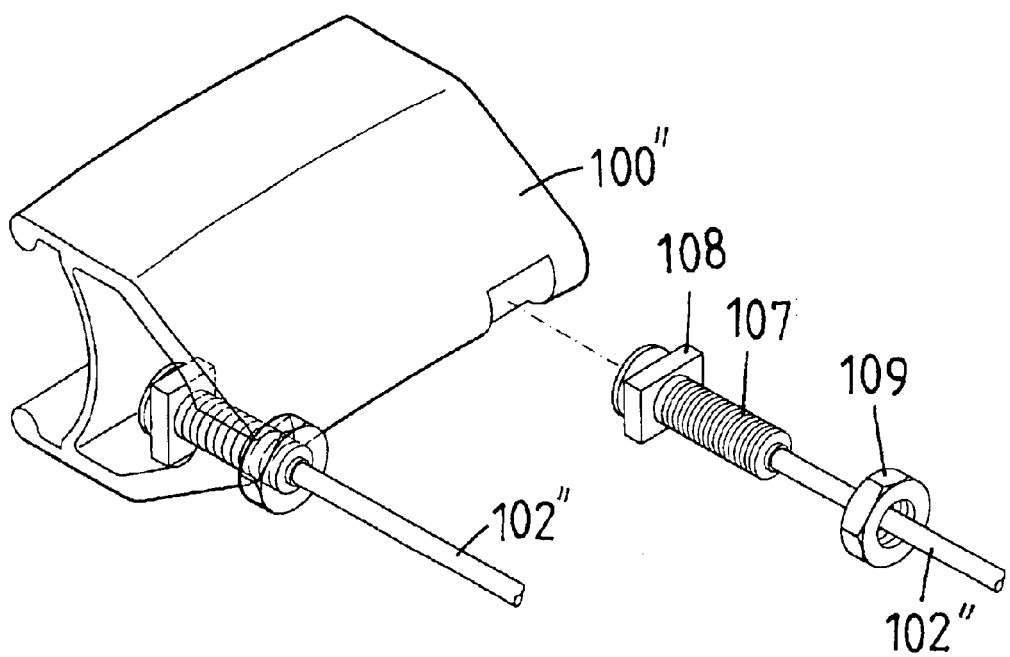
FIG. 5 is an exploded view to show a third embodiment of conventional combination of bicycle rim and spokes.
Figure 7:
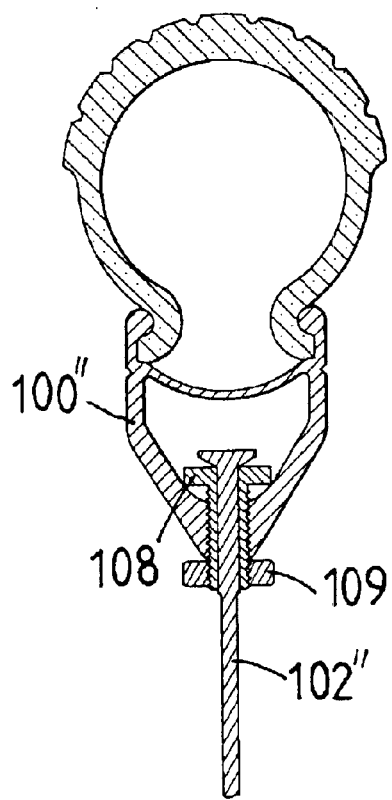
FIG. 7 is a cross sectional view of the third embodiment of conventional combination of bicycle rim and spokes.
Figure 6:
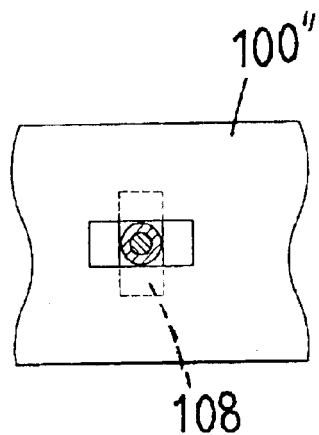
FIG. 6 shows the rectangular flange of the tube is engaged with an inside of the rim.
Figure 11:
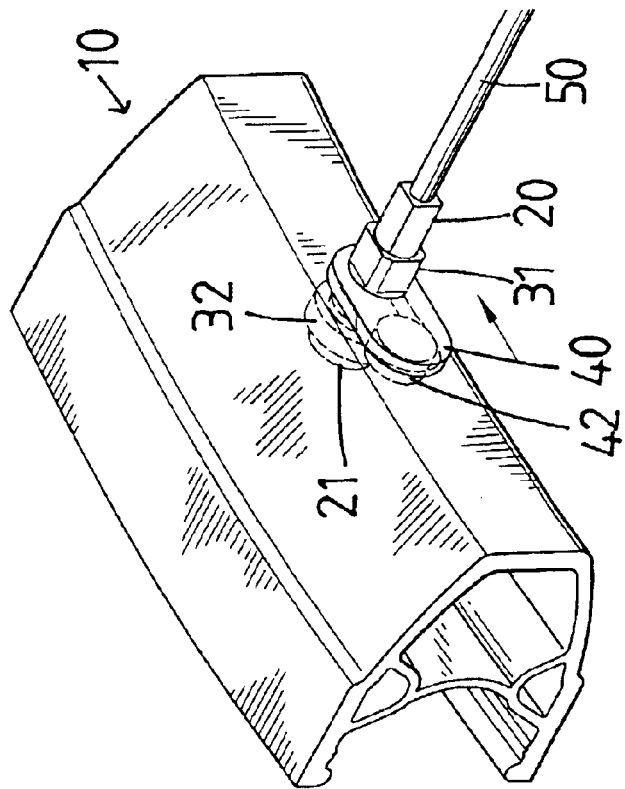
FIG. 11 shows that the cover member is shifted to cover the elongate slot.

A cover member 40 has a threaded hole 41 defined therethrough which is threadedly connected to the threaded outer periphery 33 of the tube 30. A protrusion 42 extends from a side of the cover member 40 and engaged with the first diameter portion 11 of each elongate slot while the tube 30 is shifted to the second diameter portion 11 as shown in FIG. 9 and 11. The cover member 40 is connected to an outside of the rim 10 and covers up each elongate slot. The assemblers simply rotate the polygonal outer periphery 31 of the tube 30 to securely position the cover member 40. This simplifies the assembly processes for connecting the spokes 50 to the rim 10.

Figure 13:
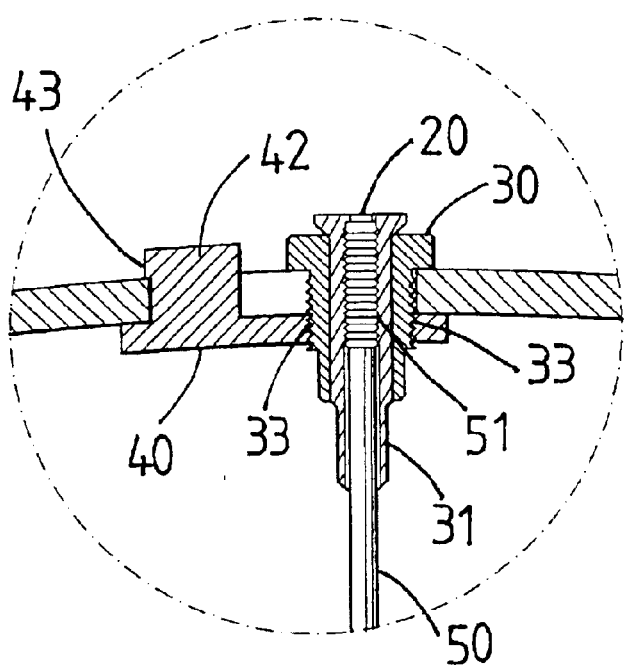
FIG. 13 shows another embodiment of the protrusion on the cover member of the present invention.

As shown in FIG. 13, the protrusion 42 may have a flange 43 extending radially outward from a distal end thereof so that the flange 43 is hooked to the inside of the rim 10 along the periphery of the first diameter portion 11 of each elongate slot.

While we have shown and described the embodiment in accordance with the present invention, it should be clear to those skilled in the art that further embodiments may be made without departing from the scope of the present invention.

What is claimed is:

1. A combination of bicycle rim and spokes, comprising:
   a rim having a plurality of elongate slots and each elongate slot composed of a first diameter portion and a second diameter portion which is smaller than the first diameter portion;
   a tube having a flange on a first end thereof and a passage defined longitudinally through the tube, the tube inserted in each of the elongate slots and the flange engaged with an inside of the rim, the tube having a threaded outer periphery;
   a core piece inserted through the passage of the tube and having an enlarged head at a first end of the core piece, the enlarged head engaged with the first end of the tube, a threaded inner periphery defined in the core piece and an end of a spoke being inserted in the core piece from a second end of the core piece and being threadedly engaged with the threaded inner periphery in the core piece, and
   a cover member having a threaded hole defined therethrough which is threadedly connected to the threaded outer periphery of the tube, a protrusion extending from a side of the cover member and being engaged with the first diameter portion of each elongate slot while the tube is shifted to the second diameter portion, the cover member connected to an outside of the rim and covering up each elongate slot.

2. The combination as claimed in claim 1, wherein a second end of the tube is a polygonal outer periphery.

3. The combination as claimed in claim 1, wherein a flange extends radially outward from a distal end of the protrusion and is engaged with an inside of the rim and along a periphery of the first diameter portion of each elongate slot.

* * * * *